Oct. 7, 1969     J. E. HEFFERNAN     3,470,832
PALLET
Filed July 21, 1967     2 Sheets-Sheet 1
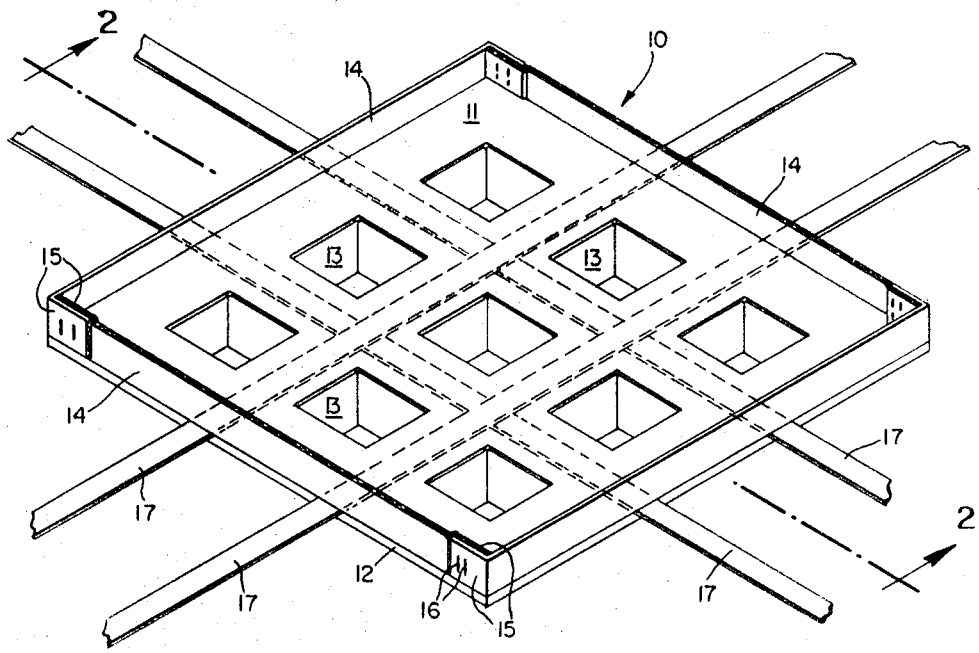
*Fig. 1*
*Fig. 2*
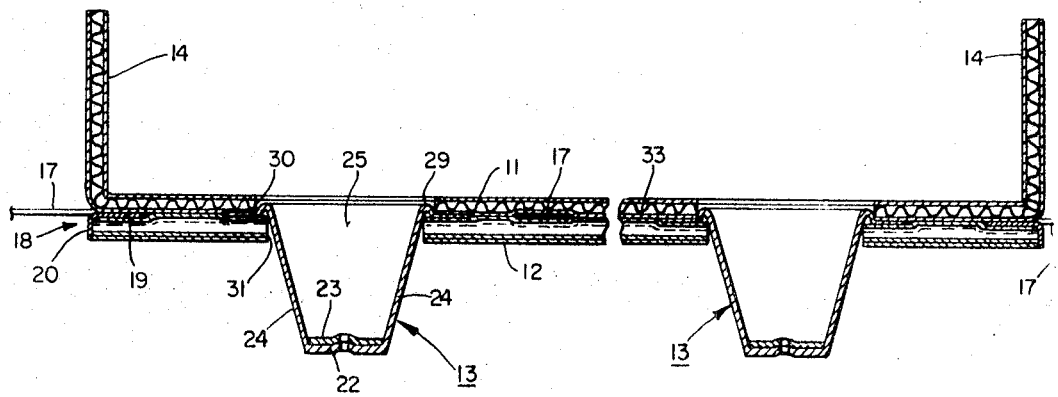
INVENTOR.
JOSEPH E. HEFFERNAN
BY John B Sowell
ATTORNEY.

United States Patent Office 3,470,832
Patented Oct. 7, 1969

3,470,832
PALLET
Joseph E. Heffernan, Gladwyne, Pa., assignor to Nest-A-Pal Corporation, Conshohocken, Pa., a corporation of Pennsylvania
Filed July 21, 1967, Ser. No. 655,202
Int. Cl. B65d 19/38
U.S. Cl. 108—53                              3 Claims

ABSTRACT OF THE DISCLOSURE

A pallet structure having two horizontal platforms serving to hold hollow shell leg supports which are nestable one into the other and reinforcement means connected integral with the platforms and the leg supports.

This invention relates to a pallet structure of the type usable with fork lift trucks, and more particularly to a nestable light weight reinforced pallet.

Background of the invention

The present novel pallet structure is of the free standing and leg supported platform type having plural related horizontal support surfaces apertured to permit stacking or nesting of the leg supports.

Heretofore the most common types of lightweight nestable pallets were made by forming molded paper and/or molding plastic sheets; such pallets have had limited industrial application due to strength limitations. Heavy-duty nestable pallets have been made for industrial use, but these structures have had deep structural platforms which required excessive storage space. Formerly, pallets of the heavy-duty nestable type have been bulky and expensive to manufacture. Attempts have been made to produce heavy-duty lightweight pallets by building platforms embodying honeycomb structures; pallets of this type were found to be expensive and usually had deep structural platforms. Heretofore nestable fiber board pallets have generally been lacking in strength, required deep structural platforms and were too expensive to be used for industrial application.

Summary of the invention

It is the principal object of the present invention to provide a disposable nestable pallet of very high strength over the entire platform.

It is a general object of the present invention to provide a light, versatile, stackable pallet-container assembly having two horizontal reinforced platform sheets.

Accordingly, there are generally provided, upper and lower platform sheets, reinforced at the edges thereof by vertical web members, a plurality of leg support structures having horizontal reinforcing flanges and depending legs which protrude through apertures in the lower platform and which mate with apertures in the upper platform, said leg support structures being affixed by their flanges at the apertures by bonding means which connect the platform sheets.

Advantages of the novel structure reside in its low cost and high strength. While the pallet is cheap enough to be thrown away if cost of storage and return transportation are high, it is durable enough to be reused numerous times. The manner in which these advantages have been achieved will become apparent from the description which follows.

Drawings

FIG. 1 is a perspective view of the preferred embodiment pallet construction.

FIG. 2 is an enlarged section taken along lines 2—2 of FIG. 1.

Description of the preferred embodiment

Figure 3:
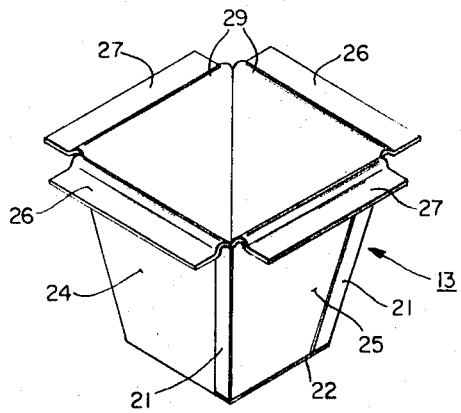
FIG. 3 is a perspective view of the preferred embodiment leg support structure of FIGS. 1 and 2.

FIGS. 1 and 2 show the novel pallet-shipping-container 10 fully assembled and ready to receive either a package load or a plurality of stackable articles. Pallet 10 generally comprises an upper rectangular platform 11 and a lower rectangular platform 12. The platforms are connected together as a sandwich and embrace therebetween the flanges of a plurality of leg support structures 13. Upper rectangular platform 11 is provided with foldable edge members 14 which when oriented normal to the platform provide vertical web reinforcement to the edges of the pallet 10. Ends 15 of the foldable edge members 14 may be left open or may be provided with interlocking connections, such as the staples 16, shown, or in other well-known manner to provide interlocking connections. Foldable edges 14 preferably lay flat in the horizontal plane of the pallet 10 during assembly, storage or shipping and are upturned during use to provide vertical web reinforcement to the platform edges and lateral restraint to any load placed on the pallet.

Straps 17 are placed between the upper and lower platforms during the assembly operation and become permanently affixed therebetween. When tied around a load on the pallet they hold edge members 14 in a vertical position. In FIG. 1 the straps 17 are shown placed intermediate leg support structures 13 but may be placed along the edges of the platforms 11, 12 to provide additional reinforcement to the edges when tied around a load placed on the pallet. Straps made from woven plastic fibers have been found to be particularly well suited for this application. Such straps 17 are light in weight and have very high tensile strength.

Referring to FIG. 2, there is shown angle member 18 which is provided with a horizontal web 19 and a vertical web 20. The horizontal web 19 is placed between the upper platform 11 and the lower platform 12 during assembly and is integrally connected to the pallet structure by the same adhesive means employed to connect the platforms. Angle members 18 are preferably made from thin metal strips and placed around the entire perimeter of the pallet, thus, considerably enhancing the load carrying capacity of the edges and further serving to protect the edges of the pallet from damage.

Figure 4:
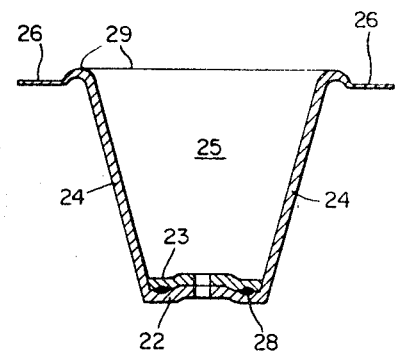
FIG. 4 is a section through the leg support structure of FIG. 3.

The preferred truncated pyramid leg support structure 13, shown in FIGS. 2 to 4, comprises a series of flat planes which may be formed in one or two pieces by simple folding operations on dies in a brake press. Each of the similarly shaped pieces comprises a common base member 22, 23, tapered and inclined leg members 24, 25 and horizontal flange members 26, 27 formed as substantially flat planes. Tapered and inclined leg members 24, 25 may be provided with overlapping tabs 21 for interconnecting the leg members. The two pieces are preferably connected by resistance welds 28 through the base members 22, 23 or by interconnecting the overlapping tabs 21 to the inclined leg members 24, 25. Structurally the leg structure 13 is a symmetrical flat plane column with large horizontal connecting flanges at the top. Each leg member 24 or 25 is supported by an adjacent leg 25 or 24. Horizontal flanges 26, 27 are provided with raised beads 29 which stiffen the flanges in their horizontal plane and serve as vertical flexible connections between the legs and the flanges to prevent the flanges from pulling out from between the platforms.

As shown in FIG. 2, the leg structure 13 will center itself when inserted through aperture 31 of lower platform 12, and raised beads 29 serve to center the upper platform 11 by engaging aperture 30. Apertures 30 and 31 have common centers and are arranged in mating rows and columns. Preferably the spacing of leg structures 13 remains constant even though the size of the rectangular platform may vary so that different size pallets remain nestable. The strength or load carrying capacity of an individual pallet may be varied by changing the strength or material of the platforms and/or the leg structures.

Platforms 11 and 12 are shown in FIG. 2 as being made of corrugated paper, connected with their grains crossed to provide symmetrical platform strength. Ordinarily the straps 17, webs 19 and flanges 26, 27 tend to separate the platforms. It has been found advantageous to construct at least one of the platforms 11 or 12 of a compressible material similar to corrugated paper board so that it will compress over the straps 17, webs 19 and flanges 26, 27 and form a surface contact between platforms. During assembly operations the complete mating surfaces of the platforms are coated with adhesive 33, the legs, straps and angles are positioned, and the platforms are compressed together to produce a surface to surface bond using common adhesives. Even when the load requirements of a pallet are high, the upper or load-carrying platform 11 may be made of a non-compressible fiber board, the lower or retaining platform 12 is preferably a compressible paper board. When the thickness of the webs 19, straps 17 and flanges 26, 27 is sufficient to separate the platforms it is necessary to employ mastics or adhesive resins 33 which do not depend on thin surface to surface contact for their strength. Adhesive resins 33 with thixotropic fillers have been found to be particularly advantageous in such applications.

Figure 5:
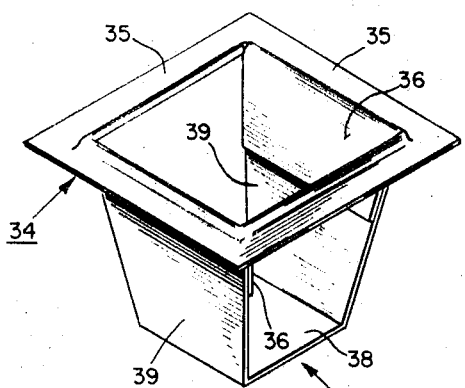
FIG. 5 is a perspective view of a modified form of a two piece leg support structure.
Figure 6:
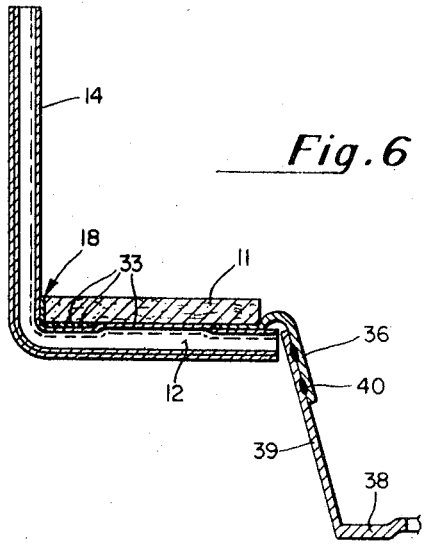
FIG. 6 is a section through a modified pallet having a leg support structure of the type shown in FIG. 5.

FIGS. 5 and 6 illustrate a modified two-piece leg support structure. The upper sheet member 34 is cut and formed in the shape of a rectangular band or margin 35 in the horizontal plane having at least one pair of depending leg members 36 extending downwardly. The lower sheet member 37 is formed to provide a base member 38 having at least one pair of upwardly inclined leg members 39 extending therefrom. Leg members 36 and 39 are overlapped and connected at their mating faces by conventional means, such as spot welds 40.

FIG. 6 further illustrates a rearrangement of structural parts. Lower platform 12 is provided with a foldable edge member 14 which adds vertical web reinforcement and lateral load support to the pallet. Angle member 18 has an upwardly directed vertical web which may be extended upward and outward past the top of the platform 12 to supplement or replace foldable edge member 14. Should the foldable edges 14 or the upwardly directed webs of angles 18 extend beyond the top of upper platform 11, the addition of a slight upward and outward taper permits the pallets to remain fully nestable. It is sometimes desirable to separate nestable pallets so that they can be stacked and still be accessible to a fork lift truck. Ordinarily a filler sheet is used to separate pallets, but a filler sheet does not strengthen or reinforce the platform and must be moved separately from the pallet.

Figure 7:
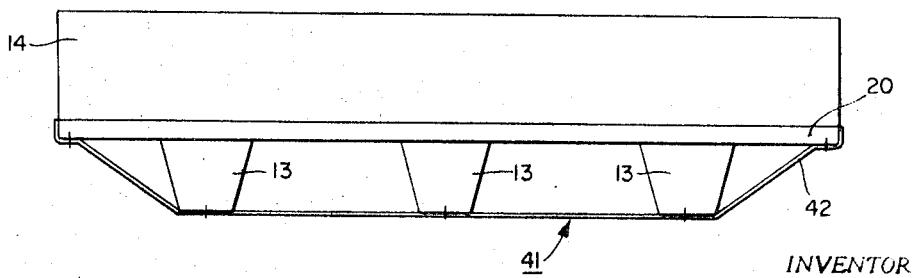
FIG. 7 is an elevation of a modified pallet showing a reinforcement for the leg supports and pallet edges.

FIG. 7 shows a further modification of the pallets described hereinbefore which permits the nestable pallet to be made double-faced and stackable. Skis or runners 41 are shown attached to the leg support structures 13 at the base thereof. Bases 22, 23 and/or 38 may be cupped as shown in FIGS. 2, 4 and 6, so that attachment means, not shown, do not protrude when connecting the skis to the legs. The ends 42 of the skis 41 are provided with apertures which mate with similar apertures in the edge of the pallet, thus permitting ease in assembly or disassembly. Even though the skis are preferably made of plexible thin strips of steel, they tend to be stiff by virtue of their connection to the legs and/or edges of the platforms. It is apparent that skis of rigid material or wood strips will further increase the strength of the pallet. Upturned ends 42 of formable rigid material will also support the platform without being attached thereto.

The novel pallet has been described with reference to a preferred embodiment and modifications which illustrate the features jointly and severally.

I claim:

1. A nestable pallet of the type having reinforcing means comprising: a rectangular upper platform, a rectangular lower platform, L-shaped reinforcement means having a vertical web structural member overlapping the outer edges of one of said rectangular platforms and a horizontal web extending between said platforms, mating rectangular apertures in said platforms arranged in rows and columns, a plurality of leg support structures each having a pair of similarly shaped members arranged normal to each other sharing a common base each having a pair of horizontal flanges, a pair of tapered leg members and a horizontal base member, said leg members being extended through the apertures in said lower platform, said flanges of said leg structures and said horizontal web of said L-shaped reinforcement means being embedded in one of said platforms to permit the surfaces of the platforms to touch, and bonding means securing the mating surfaces of said platforms together and bonding said horizontal flanges and webs therebetween to provide a nesting pallet having edge reinforcement means integral therewith.

2. A nestable pallet of the type set forth in claim 1, wherein said leg support structure is shaped as a flanged truncated pyramid member and each tapered leg member is provided with a reinforcing tab overlappingly secured to an adjacent leg member.

3. A nestable pallet of the type set forth in claim 2, which further includes leg member reinforcing skis connected to the horizontal base members of aligned leg support structures and terminating in upturned ends extending to the platform edges, said skis providing platform edge reinforcement and double-faced pallet separation.

References Cited
UNITED STATES PATENTS

| | | | |
|---|---|---|---|
| 2,544,657 | 3/1951 | Cushman | 108—53 |
| 2,594,287 | 4/1952 | Budd | 108—55 XR |
| 2,706,099 | 4/1955 | Whalley | 108—53 |
| 2,953,339 | 9/1960 | Roshon | 108—56 |
| 3,079,876 | 3/1963 | Doane | 108—56 |
| 3,199,469 | 8/1965 | Sullivan | 108—53 |
| 3,223,564 | 2/1966 | Sullivan | 108—53 |

BOBBY R. GAY, Primary Examiner

GLENN O. FINCH, Assistant Examiner